United States Patent
Cummings

(10) Patent No.: US 10,078,825 B2
(45) Date of Patent: Sep. 18, 2018

(54) APPARATUS AND METHOD FOR INTERFACING WITH THIRD PARTY POINT OF SALE DEVICES

(71) Applicant: Nextep Systems, Inc., Troy, MI (US)

(72) Inventor: Marshall Cummings, Troy, MI (US)

(73) Assignee: Nextep Systems, Inc., Troy, MI (US)

( * ) Notice: Subject to any disclaimer, the term of this patent is extended or adjusted under 35 U.S.C. 154(b) by 667 days.

(21) Appl. No.: 14/182,119

(22) Filed: Feb. 17, 2014

(65) Prior Publication Data

US 2015/0235193 A1    Aug. 20, 2015

(51) Int. Cl.
| | |
|---|---|
| G06Q 30/00 | (2012.01) |
| G06Q 20/20 | (2012.01) |
| G06Q 30/06 | (2012.01) |
| G06Q 50/12 | (2012.01) |
| G07C 9/00 | (2006.01) |

(52) U.S. Cl.
CPC ....... *G06Q 20/202* (2013.01); *G06Q 30/0635* (2013.01); *G06Q 50/12* (2013.01); *G07C 9/00087* (2013.01); *G07C 9/00103* (2013.01)

(58) Field of Classification Search
CPC .................................................... G06Q 50/12
USPC ......................................................... 705/15
See application file for complete search history.

(56) References Cited

U.S. PATENT DOCUMENTS

| | | |
|---|---|---|
| 5,754,760 A | 5/1998 | Warfield |
| 5,781,720 A | 7/1998 | Parker et al. |
| 6,438,745 B1 | 8/2002 | Kanamaru et al. |
| 7,461,342 B2 | 12/2008 | McLean |
| 8,171,460 B2 | 5/2012 | Pizzoli et al. |
| 8,190,483 B2 * | 5/2012 | Woycik et al. ............ 705/26.1 |
| 8,499,288 B2 | 7/2013 | Franklin et al. |
| 2003/0065565 A1 * | 4/2003 | Wagner et al. ................ 705/15 |
| 2007/0226056 A1 | 9/2007 | Belanger et al. |
| 2009/0228836 A1 * | 9/2009 | Silva ............................. 715/841 |
| 2009/0292591 A1 | 11/2009 | Schultz et al. |
| 2010/0280918 A1 | 11/2010 | Balent |

(Continued)

FOREIGN PATENT DOCUMENTS

| | | |
|---|---|---|
| WO | 05069112 A2 | 7/2005 |
| WO | 05114408 A2 | 12/2005 |

OTHER PUBLICATIONS

Office Action for related U.S. Appl. No. 12/167,047 dated Jun. 28, 2011.

(Continued)

*Primary Examiner* — Ramsey Refai
(74) *Attorney, Agent, or Firm* — Harness, Dickey & Pierce, P.L.C.

(57) ABSTRACT

An ordering system for a business includes an ordering terminal, a queue module, an order execution module, and an agent. The ordering terminal receives a first order from a first person. The queue module stores data representing the first order. The order execution module conveys the first order to the point of sale terminal. The agent is installed on a point of sale terminal and selectively sends user interface events to a point of sale application executing on the point of sale terminal. The order execution module conveys the first order to the point of sale terminal by (i) retrieving the data representing the first order from the queue module and (ii) instructing the agent to send user interface events according to the retrieved data.

31 Claims, 16 Drawing Sheets

(56) References Cited

U.S. PATENT DOCUMENTS

2013/0262594 A1* 10/2013 Bastide et al. ............... 709/206
2013/0273853 A1* 10/2013 Reed et al. ............... 455/67.11

OTHER PUBLICATIONS

Amendment dated Dec. 27, 2011 responding to Office Action for related U.S. Appl. No. 12/167,047 dated Jun. 28, 2011.
Office Action for related U.S. Appl. No. 12/167,047 dated Jun. 21, 2012.
Appeal Brief dated Jan. 22, 2013 responding to Office Action for related U.S. Appl. No. 12/167,047 dated Jun. 21, 2012.
Office Action for related U.S. Appl. No. 12/167,047 dated Jun. 6, 2013.
Pre-Appeal Brief dated Nov. 5, 2013 responding to Office Action for related U.S. Appl. No. 12/167,047 dated Jun. 6, 2013.
Pre-Appeal Brief Decision dated Mar. 12, 2014 responding to Pre-Appeal Brief filed Nov. 5, 2013 for related U.S. Appl. No. 12/167,047.
Appeal Brief dated May 12, 2014 responding to Pre-Appeal Brief for related U.S. Appl. No. 12/167,047 dated Mar. 12, 2014.
Stack Overflow; VB Script; Jun. 13, 2013; 1 page.
AppleScript; Graphic User Interface (GUI) Scripting; Sep. 10, 2013; 3 pages.
Apple, Inc.; Automating UI Testing; Instruments User Guide; Copyright © 2013; Apr. 23, 2013; p. 81.
Class Robot; Java™ Platform Standard Ed. 7; Copyright © 2013; 8 pages.
WinAutomation; Softomotive, Ltd.; Copyright © 2013; 6 pages.
U.S. Appl. No. 12/167,047, filed Jul. 2, 2008.
Examiner's Answer dated Sep. 12, 2014 for related U.S. Appl. No. 12/167,047.
Reply Brief dated Nov. 12, 2014 for related U.S. Appl. No. 12/167,047.

* cited by examiner

| Action Label | Click Sequence |
|---|---|
| Login | (x1, y1), (x2, y2), ... |
| Dine_In | ... |
| Take_Out | ... |
| Cash_Out | ... |
| French Dip | ... |
| Pulled Pork | ... |

FIG. 9

| Element ID | 3rd Party Text | Diagonal X,Y Coordinates | Screen # | Type | Assigned Label | Next Screen |
|---|---|---|---|---|---|---|
| 0 | 0 | x1,y1,x2,y2 | 0 | Button | Login_0 | - |
| 1 | 1 | ... | 0 | Button | Login_1 | - |
| 2 | 2 | ... | 0 | Button | Login_2 | - |
| 3 | 3 | ... | 0 | Button | Login_3 | - |
| 4 | 4 | ... | 0 | Button | Login_4 | - |
| 5 | 5 | ... | 0 | Button | Login_5 | - |
| 6 | 6 | ... | 0 | Button | Login_6 | - |
| 7 | 7 | ... | 0 | Button | Login_7 | - |
| 8 | 8 | ... | 0 | Button | Login_8 | - |
| 9 | 9 | ... | 0 | Button | Login_9 | - |
| 10 | Sign In | ... | 0 | Navigate | Login | 1 |
| 11 | Specials | ... | 0 | Ignore | - | - |
| 12 | 9:35 | ... | 0 | Ignore | - | - |
| 13 | Here | ... | 1 | Button | Dine_In | - |
| 14 | Take Out | ... | 1 | Button | Take_Out | - |
| 15 | Manager | ... | 1 | Ignore | - | - |
| 16 | Sandwiches | ... | 1 | Navigate | Sandwiches | 2 |
| 17 | Sides | ... | 1 | Navigate | Sides | 3 |
| 18 | Drinks | ... | 1 | Navigate | Beverages | 4 |
| 19 | Desserts | ... | 1 | Navigate | Desserts | 5 |
| 20 | Misc. | ... | 1 | Navigate | Miscellaneous | 6 |
| 21 | Reuben | ... | 1 | Menu | Sand_Reuben | - |
| 22 | Grilled Cheese | ... | 1 | Menu | Sand_GrilledCheese | - |
| 23 | Chick. Salad Sandwich | ... | 1 | Menu | Sand_ChickenSalad | - |
| 24 | Club Sandwich | ... | 1 | Menu | Sand_Club | - |
| 25 | Iced Tea | ... | 1 | Menu | Drink_IcedTea | - |
| 26 | Current Order | ... | 1 | Text | Order_List | - |
| 27 | Pay | ... | 1 | Button | Cash_Out | - |
| 28 | Modify | ... | 1 | Ignore | - | - |
| 29 | Hold | ... | 1 | Ignore | - | - |

FIG. 10

APPARATUS AND METHOD FOR INTERFACING WITH THIRD PARTY POINT OF SALE DEVICES

FIELD

The present disclosure relates to interfacing with third-party sales systems via point of sale devices of the third-party sales systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In FIG. 1, a homogeneous sales system includes first and second kiosks 100 and 104 that interface with a backend server 108. The backend server 108 may generate images for display on digital menu boards 112. The images portray items for sale, and may include prices and product images. The kiosks 100 and 104 may be referred to as kiosks, and may be adapted for use by customers.

For more sophisticated users, such as employees of the business, a point of sale terminal 116 may be implemented in communication with the backend server 108. The point of sale terminal 116 may have higher information density created by smaller buttons, fewer or no product images, and more terse text.

Orders can be placed using the kiosks 100 and 104, as well as the point of sale terminal 116. The backend server 108 keeps track of the orders and manages fulfillment of the orders. For example, in a restaurant, the backend server 108 may display orders to employees via a fulfillment management system 120.

Employees responsible for preparing food and assembling orders watch the fulfillment management system 120 for order information. The fulfillment management system 120 may include a printer that prints orders on respective individual slips of paper or on a continuous roll of paper. The fulfillment management system 120 may include an electronic display to display order information, and may include a touchscreen to allow employees to indicate that an order is complete and no longer needs to be displayed. The fulfillment management system 120 may also receive input from a bump bar that causes the next order to be displayed and/or printed, and/or may cause an earlier order to be removed from the display.

The backend server 108 may implement additional functionality, such as inventory control, payment processing, and transaction logging. The backend server 108 stores items available for sale, and can store promotions, such as limited availability items and discounted prices, and operational data, such as hours of operation. This data can be reflected in the digital menu boards 112, and promotional items and prices are displayed in the kiosks 100 and 104 and at the point of sale terminal 116. When an order is placed, for example, at the kiosk 100, a total price (which may include sales tax) as well as an order number may be generated either by the kiosk 100 or by the backend server 108, and displayed to the user of the kiosk 100.

SUMMARY

An ordering system for a business includes an ordering terminal, a queue module, an order execution module, and an agent. The ordering terminal receives a first order from a first person. The queue module stores data representing the first order. The order execution module conveys the first order to the point of sale terminal. The agent is installed on a point of sale terminal and selectively sends user interface events to a point of sale application executing on the point of sale terminal. The order execution module conveys the first order to the point of sale terminal by (i) retrieving the data representing the first order from the queue module and (ii) instructing the agent to send user interface events according to the retrieved data.

In other features, the ordering terminal is offered for sale by a first vendor, and the point of sale terminal is offered for sale by a third party vendor and not by the first vendor. The first vendor provides the queue module, the agent, and the order execution module to allow the ordering terminal to interface with the point of sale terminal. In other features, a second vendor provides the agent and the order execution module to allow the ordering terminal to interface with the point of sale terminal. The ordering terminal includes a kiosk including a touchscreen adapted for use by customers of the business. The ordering terminal includes a second point of sale terminal adapted for use by employees of the business.

In other features, a second agent is installed on a second point of sale terminal. The order execution module conveys a second order to the second point of sale terminal by instructing the second agent to send user interface events to the second point of sale terminal according to data representing the second order. A second ordering terminal receives a second order from a second person. The queue module is configured to store data representing the second order.

In other features, the ordering system includes a server implementing the translation module. The server also implements the queue module. The server is configured to receive a second order from a computing device of a second person over a wireless local area network. The ordering system includes a digital menu board displaying an image including items for sale. The image is provided to the digital menu board by the server. The server is configured to receive a second order from a second person via the internet.

In other features, the ordering system includes a web server configured to (i) receive a second order from a second person via the internet and (ii) transmit the second order to the queue module. The ordering system includes a second point of sale terminal configured to receive a second order from an employee of the business, wherein the queue module is configured to store data representing the second order.

In other features, the ordering system includes a second point of sale terminal configured to receive a second order from an employee of the business. The second point of sale terminal is configured to provide the second order to a backend server. The point of sale terminal is configured to, subsequent to the first order being conveyed to the point of sale terminal, provide the first order to the backend server. The first order comprises a set of items. The set of items includes at least one food item. The first order includes a modifier for a first item of the set of items. The first order execution module is configured to convey the modifier to the point of sale terminal by instructing the agent to send user interface events corresponding to the modifier.

In other features, the ordering system includes a state machine module configured to monitor a state of the point of sale application. The state machine module is configured to receive a screenshot of a user interface of the point of sale application from the agent. The agent is configured to provide the screenshot in response to a request from the state machine module. The request specifies coordinates of a region of interest, and wherein the screenshot provided by the agent is limited to the region described by the coordinates. The state machine module is configured to perform optical character recognition on the screenshot.

In other features, the agent is configured to (i) perform optical character recognition on a user interface of the point of sale application to extract text data and (ii) transmit the text data to the state machine module. The state machine module is configured to receive an order identifier from the point of sale terminal via the agent in response to completion of conveying the first order to the point of sale terminal. The state machine module is configured to receive a monetary total from the point of sale terminal via the agent in response to completion of conveying the first order to the point of sale terminal. The state machine module is configured to compare the monetary total to a value received from the ordering terminal. The agent is configured to send user interface events to the point of sale application by sending the user interface events to an operating system of the point of sale terminal. The user interface events include at least one of click events and touch events.

A method of operating an ordering system for a business includes receiving a first order from a first person at an ordering terminal. The method further includes storing data representing the first order. The method includes conveying the first order to the point of sale terminal by (i) retrieving the data representing the first order and (ii) according to the retrieved data, instructing an agent installed on a point of sale terminal to send user interface events to a point of sale application executing on the point of sale terminal.

In other features, the ordering terminal is offered for sale by a first vendor, and the point of sale terminal is offered for sale by a third party vendor and not by the first vendor. The method includes providing, from the first vendor, the agent to allow the ordering terminal to interface with the point of sale terminal. In other features, the method includes providing, by a second vendor, the agent and the order execution module to allow the ordering terminal to interface with the point of sale terminal. The ordering terminal includes a kiosk including a touchscreen adapted for use by customers of the business. The ordering terminal includes a second point of sale terminal adapted for use by employees of the business.

In further features, the method includes conveying a second order to a second point of sale terminal by instructing a second agent installed on the second point of sale terminal to send user interface events to the second point of sale terminal according to data representing the second order. The method includes receiving a second order from a second person at a second ordering terminal and storing data representing the second order. The method includes receiving a second order from a computing device of a second person over a wireless local area network. The method includes receiving a second order from a second person via the internet.

In other features, the first order comprises a set of items that includes at least one food item. The first order includes a modifier for a first item of the set of items. The method further includes conveying the modifier to the point of sale terminal by instructing the agent to send user interface events corresponding to the modifier.

In further features, the method includes monitoring a state of the point of sale application. The method includes receiving a screenshot of a user interface of the point of sale application from the agent. The method includes providing the screenshot in response to a request from the state machine module. The request specifies coordinates of a region of interest, and the screenshot provided by the agent is limited to the region described by the coordinates. The method includes performing optical character recognition on the screenshot. The method includes sending user interface events to a point of sale application includes sending the user interface events to an operating system of the point of sale terminal. The user interface events include at least one of click events and touch events.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 9 is a representation of an example data structure that stores mappings from action items to clicks on a third-party point of sale terminal;

FIG. 10 is a representation of an example data structure used to map a third-party point of sale terminal on a screen-by-screen basis;

In the drawings, reference numbers may be reused to identify similar and/or identical elements.

DETAILED DESCRIPTION

Figure 1:
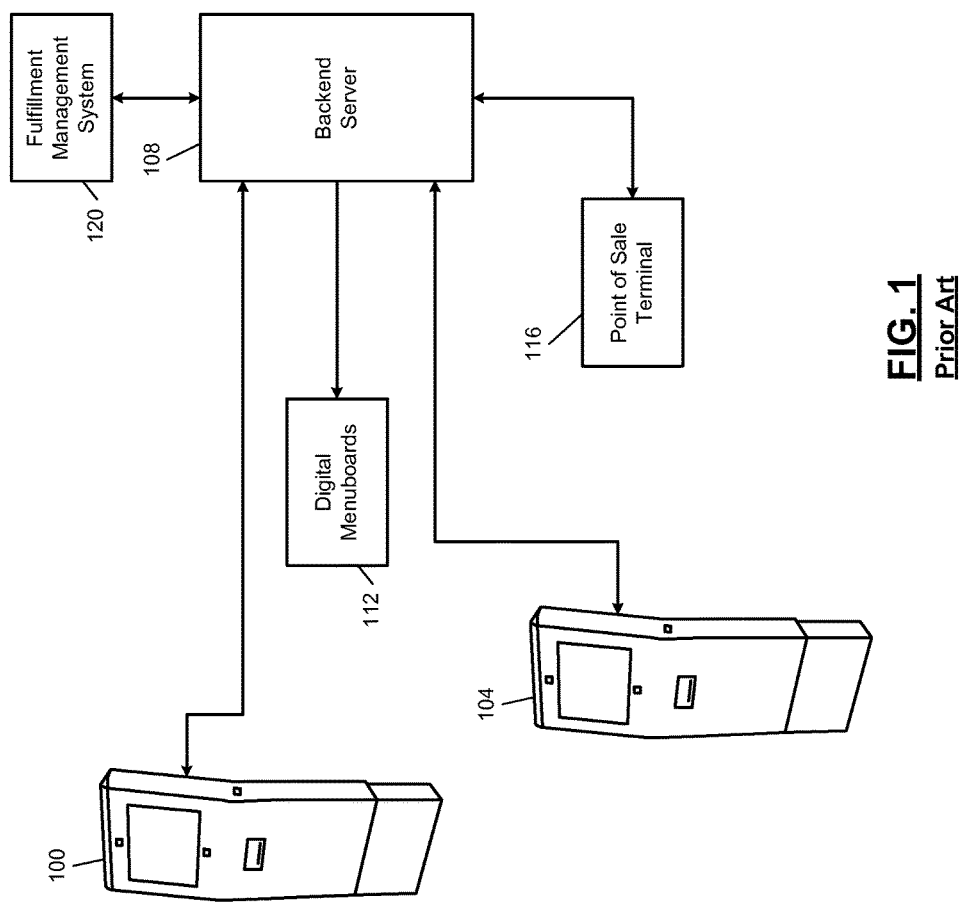
FIG. 1 is a functional block diagram of a homogeneous sales system according to the prior art.

A business may wish to benefit from the features of kiosks and digital menu boards, such as are shown in FIG. 1. However, the business may have an established backend system sold by a third-party that cannot be immediately replaced. For example, the third-party backend system may be mandated by a corporate franchisor or may offer certain proprietary functionality that is not duplicated by the backend server of FIG. 1.

The third-party backend system may also have various limitations that create vendor lock-in, such as an inability to export historical data in a usable format. In addition, accounting or budgetary constraints may prevent replacement of the third-party backend system. For example, the third-party backend system may not yet have been fully depreciated and/or a payment or a service contract may not yet have expired.

The vendor of the third-party backend system may not wish to interoperate with kiosks from another vendor. As a result, a business that wants to offer the advantages of the kiosks of FIG. 1 to customers needs a mechanism for conveying the orders from the kiosks into the third-party backend system.

The present disclosure describes using point of sale terminals of the third-party system to enter orders from the kiosks into the third-party backend system. To do this, an agent is installed on a third-party point of sale terminal that simulates the clicks or touches of an employee manually entering an order into the third-party point of sale terminal. In this way, an order from one of the kiosks is translated into touches or clicks on the third-party point of sale terminal so that the order is received by the third-party backend system without necessarily needing to modify the third-party backend system or reverse engineer the communications between third-party point of sale terminals and third-party backend servers.

Further, even if an application programming interface (API) is available to interface directly with a third-party point of sale terminal or backend server, purchasing the API may be expensive, and may be an ongoing expense. Learning and interfacing with a proprietary API may require significant development time and resources. In addition, changes to the API may require additional effort and create unexpected problems.

The third-party point of sale terminal on which the agent is installed may be non-interactive—that is, neither customers nor employees will regularly interface with the third-party point of sale terminal. Instead, the third-party point of sale terminal is used for conveying orders from the kiosks to the third-party backend server. For example only, after a setup phase, the input and output devices of the third-party point of sale terminal (such as a monitor or touchscreen) can be removed or hidden.

The agent installed on the third-party point of sale terminal may interface with the operating system of the third-party point of sale terminal to send touches, clicks, and/or key-presses so that the point of sale application executing on the third-party point of sale terminal receives input that is no different from input that is received if an employee were interactively using the third-party point of sale terminal.

When the kiosks are offered by a first vendor, the first vendor may develop and/or offer the agent and associated systems to allow the kiosks to interoperate with third-party point of sale terminals. In other implementations, a second vendor (such as a systems integrator or a value-added reseller) may instead develop and/or offer the agent and associated systems to allow the kiosks from the first vendor to interoperate with the third-party point of sale terminals.

Figure 2:
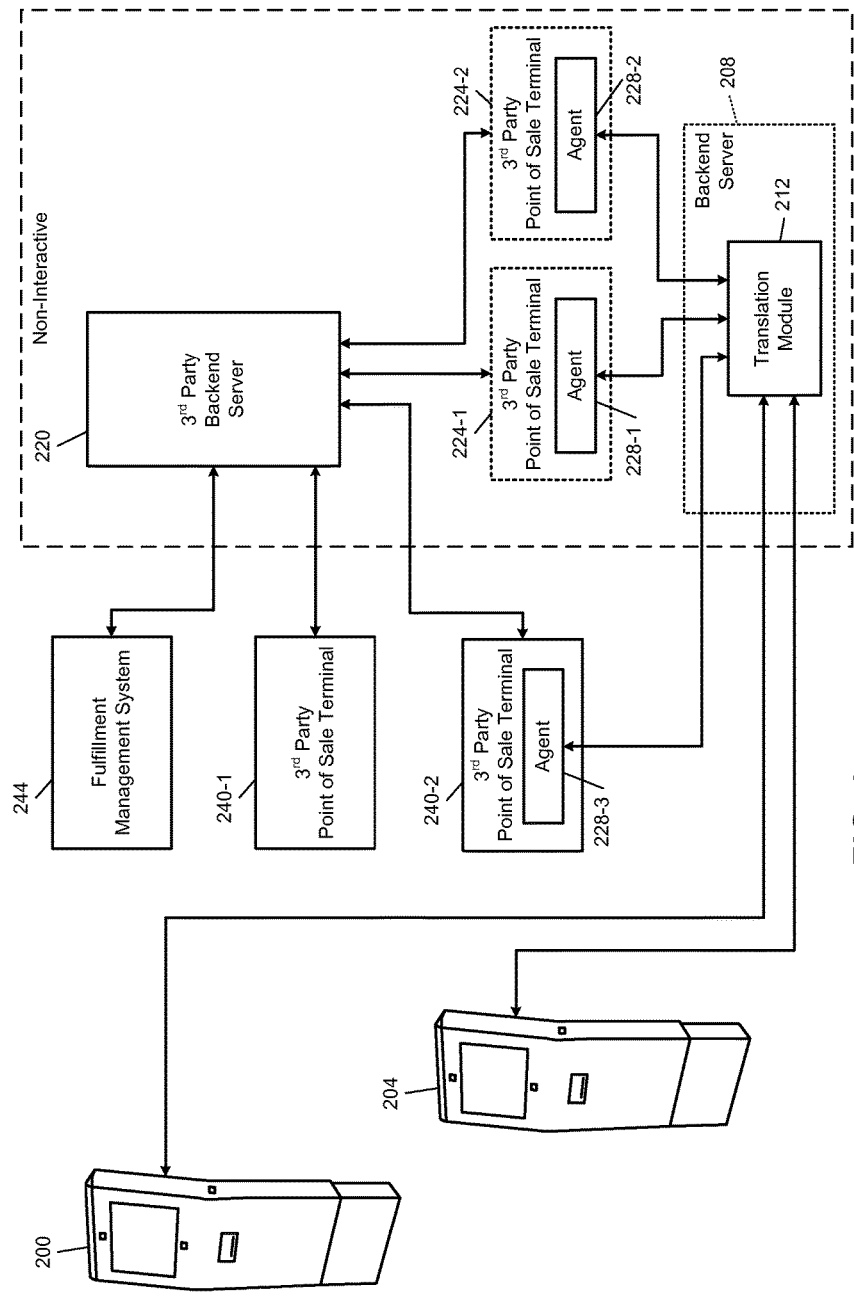
FIG. 2 is a functional block diagram of kiosks interfacing with a third-party sales system via non-interactive third-party point of sale terminals.
Figure 3:
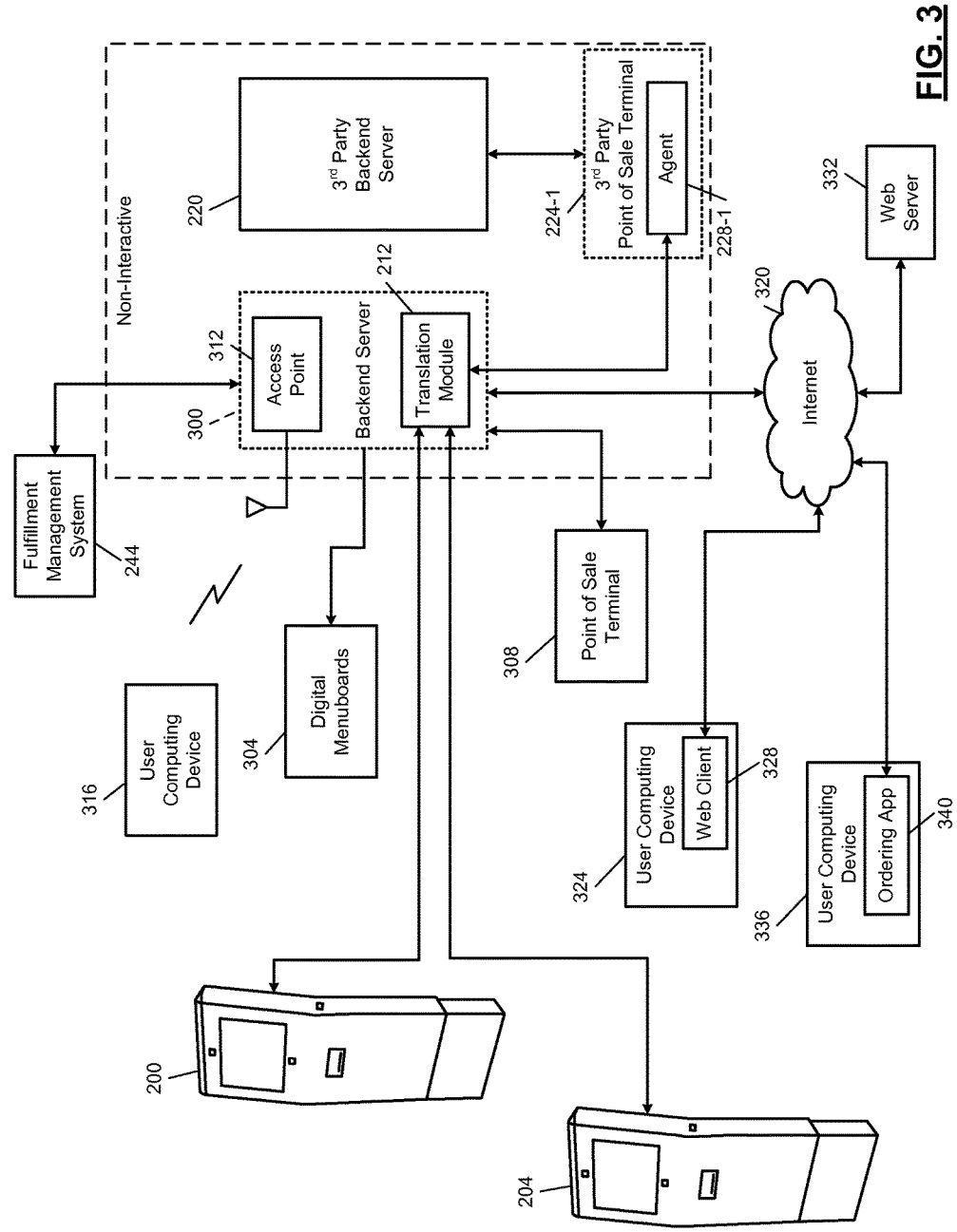
FIG. 3 is a functional block diagram of a comprehensive sales system integrated with a third-party backend server via a non-interactive third-party point of sale terminal.
Figure 4:
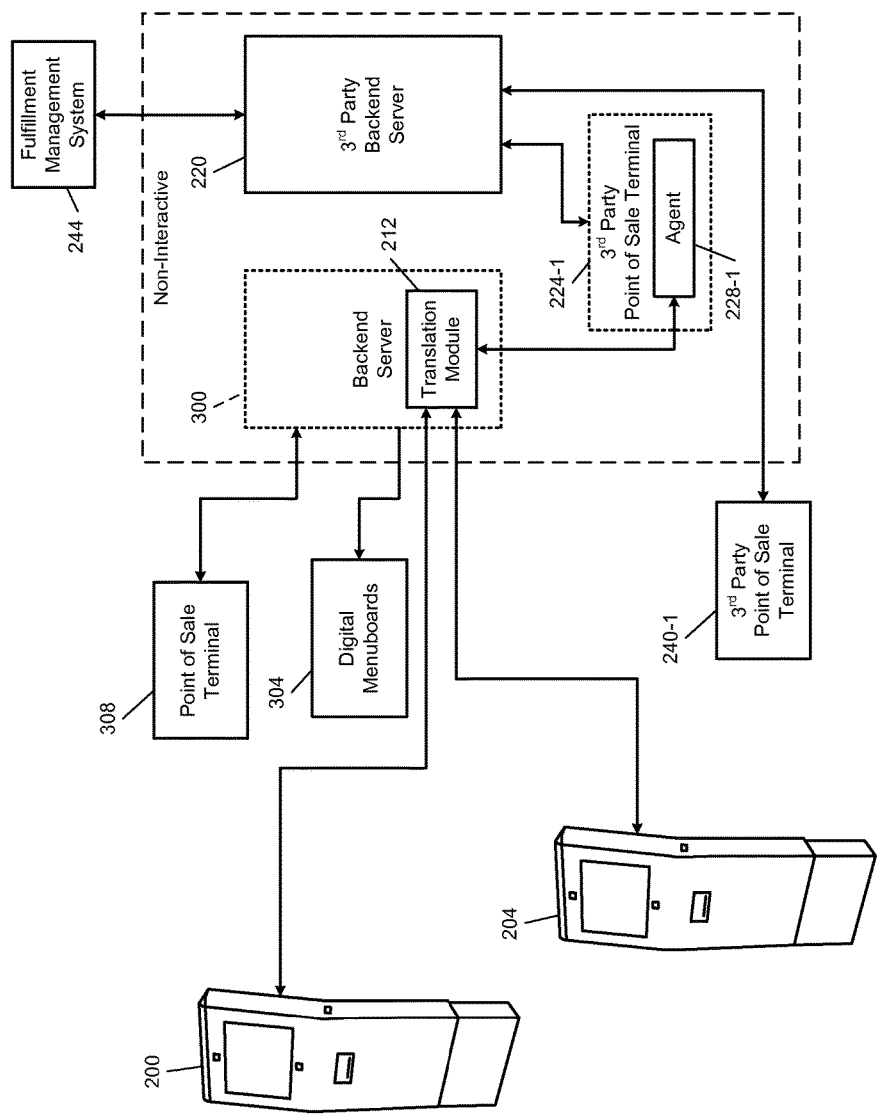
FIG. 4 is a functional block diagram of a blended system including kiosks and a third-party point of sale terminal.

FIGS. 2-4 depict various new ordering system components being integrated with a third-party backend server and various other third-party devices. In FIG. 2, kiosks 200 and 204 interface with a backend server 208, and specifically with a translation module 212 of the backend server 208. The translation module 212 receives orders input by users of the kiosks 200 and 204. The translation module 212 then conveys those orders to a third-party backend server 220 via one or more point of sale terminals.

In the example implementation of FIG. 2, two third-party point of sale terminals 224-1 and 224-2 are shown, although more or fewer can be used. The number of third-party point of sale terminals 224 may be determined based on order volume. For example, if the average time taken by the translation module 212 to enter an order into a third-party point of sale terminal is one-fifth as long as the average time a user takes to place an order, a single third-party point of sale terminal may be able to accommodate the orders generated by five separate kiosks.

On the third-party point of sale terminals 224-1 and 224-2, a respective agent 228-1 and 228-2 is installed. The agent 228-1 generates user interface events on the third-party point of sale terminal 224-1 according to instructions from the translation module 212. In addition, the agent 228-1 captures, optionally processes, and transmits data back to the translation module 212. This data may be used to verify that the actual state of the third-party point of sale terminal matches the belief of the translation module 212 regarding the state. The agent 228-2 functions similarly to the agent 228-1.

Third-party point of sale terminals 240-1 and 240-2 allow employees of the business to efficiently enter orders. These orders are communicated directly to the third-party backend server 220. The kiosks 200 and 204 may receive payment information, such as credit card data, and either process transactions themselves (or at the backend server 208) or relay the payment information to the third party backend server 220. For example, the agent 228-1 may inject payment information into the third party point of sale terminal 224-1 by providing corresponding touches on an onscreen keyboard, similar to how logging in is performed. If the third party point of sale terminal 224-1 expects to receive input from a universal serial bus human interface device (USB HID) card reader device, the payment information may be typed as keyboard input by the agent 228-1. The keyboard input may be equivalent to the input from the USB HID card reader device as far as the input software of the third party point of sale terminal 224-1 is aware.

The kiosks 200 and 204 are preprogrammed with the items that are for sale and the corresponding prices. The kiosks 200 and 204 may therefore be able to calculate a total bill for the order. Alternatively, the translation module 212 may determine the total bill as calculated by the third-party point of sale terminal 224, using the respective agent 228. The translation module 212 then transfers the total bill back to the kiosks 200 or 204.

An order number may be generated by the third-party backend server 220 or by one of the third-party point of sale terminals 224. This order number may be used by the customer to pick up the corresponding order. In various implementations, the order number may not be determinable by the kiosks 200 or 204, and therefore is captured by the translation module 212 and provided back to the respective kiosk.

A fulfillment management system 244 outputs order information, as described above with respect to FIG. 1, to employees who are creating and/or assembling customer orders. Although two kiosks 200 and 204 are shown for illustration, more or fewer may be implemented at any given location. The kiosks may be located inside of a building or outside of the building. Outside, the kiosks may be free-standing or integrated with an exterior of the building. Inside, the kiosks may be located at an ordering counter, at individual tables, or at other suitable locations throughout the building.

The backend server 208, the third-party point of sale terminals 224, and the third-party backend server 220 are labeled with a dashed box as non-interactive because neither customers nor employees directly interact with these components on a regular basis. Additionally or alternatively, agents may be installed in interactive point of sale terminals. For example, an agent 228-3 may be installed in the third party point of sale terminal 240-2. The agent 228-3 may be programmed to determine when the third party point of sale terminal 240-2 is being used by an employee, so that the agent 228-3 is not activated by the translation module 212 while the employee is entering an order manually.

When the agent 228-3 is going to begin transmitting an order using the third party point of sale terminal 240-2, the agent 228-3 may display a countdown on the screen to warn employees that the third party point of sale terminal 240-2 is about to become unavailable for manual entry. During order transmission, the agent 228-3 may be able to prevent manual control of the third party point of sale terminal 240-2. The agent 228-3 may also cause a screen of the third party point of sale terminal 240-2 to be blank to prevent employees from interrupting the order transmission process.

The backend server 208 may be physically located in either of the kiosks 200 or 204. Alternatively, the functionality of the backend server 208 may be implemented in software running on either of the kiosks 200 or 204. For example only, each of the kiosks 200 and 204 may have their own implementation of the translation module 212. In such situations, the kiosks 200 and 204 may communicate only with the respective one of the agent 228-1 and the agent 228-2. Where the number of kiosks is not equal to the number of agents, access to the agents may be arbitrated between the various operating terminals. For example, one of the kiosks may act as the master, instructing each kiosk on which agent(s) to use.

In FIG. 3, a backend server 300 includes the translation module 212, which interfaces with the kiosks 200 and 204. The backend server 300 may also provide images to digital menu boards 304, and may receive orders from a point of sale terminal 308. The translation module 212 still conveys orders to the third-party backend server 220 via the third-party point of sale terminal 224-1. These orders may be received from the kiosks 200 and 204 and from the point of sale terminal 308. For simplicity of illustration, a single third-party point of sale terminal is shown, although more can be used depending on expected order volume.

The translation module 212 may convey to the third party point of sale terminal 224-1 regarding which employee is logged into the point of sale terminal 308. For example only, separate logins may be set up in the third party point of sale terminal 224-1 corresponding to one or more of the employees authorized to log into the point of sale terminal 308. The translation module 212 then instructs the agent 228-1 to use the login corresponding to the logged-in employee when placing orders. The third party backend server 220 then has a record of who was logged into the point of sale terminal 308 while orders were being placed at the kiosks 200 and 204. For example only, the point of sale terminal 308 may allow a user to authenticate using a pin code, a magnetic stripe card, a radio frequency identifier card, and/or a biometric identifier.

The backend server 300 may include an access point 312 that establishes a wireless local area network (WLAN) and provides wireless access to computing devices of customers, such as smartphones, tablets, and laptops. A single user computing device 316 is shown for illustration. The WLAN module 312 may allow users to place orders, and may also provide customers with access to the internet 320.

The backend server 300 may also receive orders from a user computing device 324 over the internet 320. For example, the user computing device 324 may include a web client (also known as a web browser) 328 that accesses an ordering page provided by a web server within the backend server 300.

Alternatively, the web client 328 may access a separate web server 332. The web server 332 may be located on the premises of the business or remote from the business, and may be virtually hosted by a cloud computing provider. The web server 332 receives the orders and transmits the orders to the backend server 300. Additionally or alternatively, a user computing device 336 may include an ordering application 340 that allows a user to enter an order. The order information is transmitted to the backend server 300 or to a separate server such as the web server 332. The order data can be transmitted in any form, such as by using SOAP (Simple Object Access Protocol) to transmit XML (Extensible Markup Language) data over HTTP (Hypertext Transfer Protocol).

In FIG. 4, the point of sale terminal 308 is implemented along with the third-party point of sale terminal 240-1. One example where the alternative point of sale terminals might both be used is in a restaurant where one set of employees places dine-in orders while a different set of employees places carryout orders. For example, the point of sale terminal 308 may be used by wait staff to enter orders for dine-in customers, while the third-party point of sale terminal 240-1 includes seating and reservation features used by hosts and hostesses. The hosts/hostesses may also use the third-party point-of-sale terminal 240-1 to enter carry-out food orders.

Figure 5A:
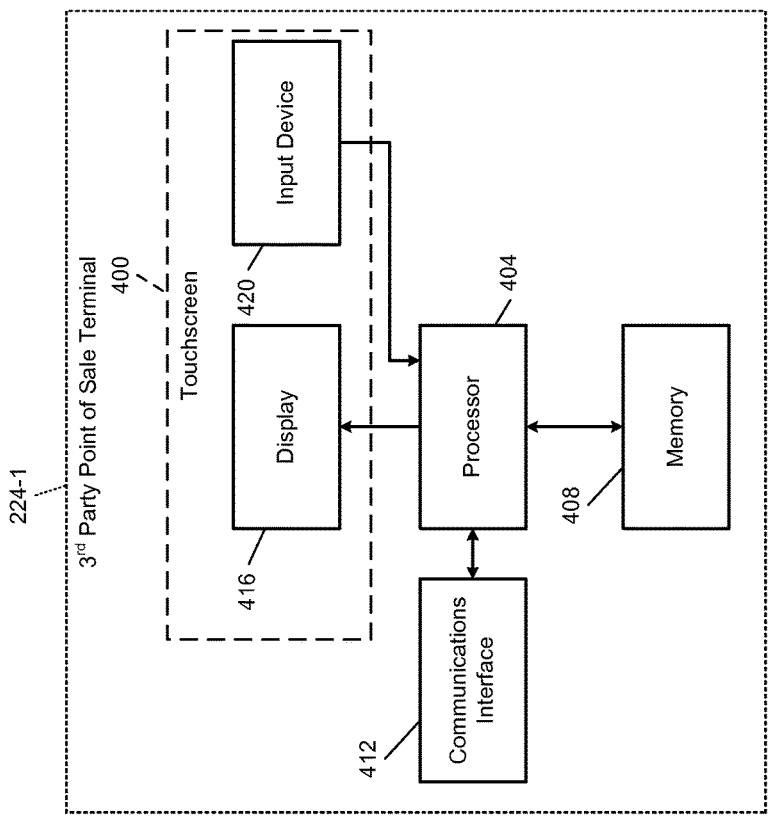
FIG. 5A is a simplified schematic of a third-party point of sale terminal.

In FIG. 5A, simplified hardware of an example implementation of the third-party point of sale terminal 224-1 includes a touchscreen 400, a processor 404, memory 408, and a communications interface 412. The communications interface 412 allows the third-party point of sale terminal 224-1 to communicate with the third-party backend server 220 of FIGS. 2-4. In various implementations, the communications interface 412 may implement Ethernet or a proprietary interface.

The touchscreen 400 includes a display component 416 as well as an input device 420, such as a resistive and/or capacitive sensor grid. The processor 404 processes inputs from the input device 420 and outputs images to the display 416 according to program code stored in the memory 408. While the memory 408 is shown with a single rectangle, the memory 408 may include multiple interconnected entities such as read only memory, random access memory, and various forms of persistent storage, such as flash memory and hard disk drives.

Figure 5B:
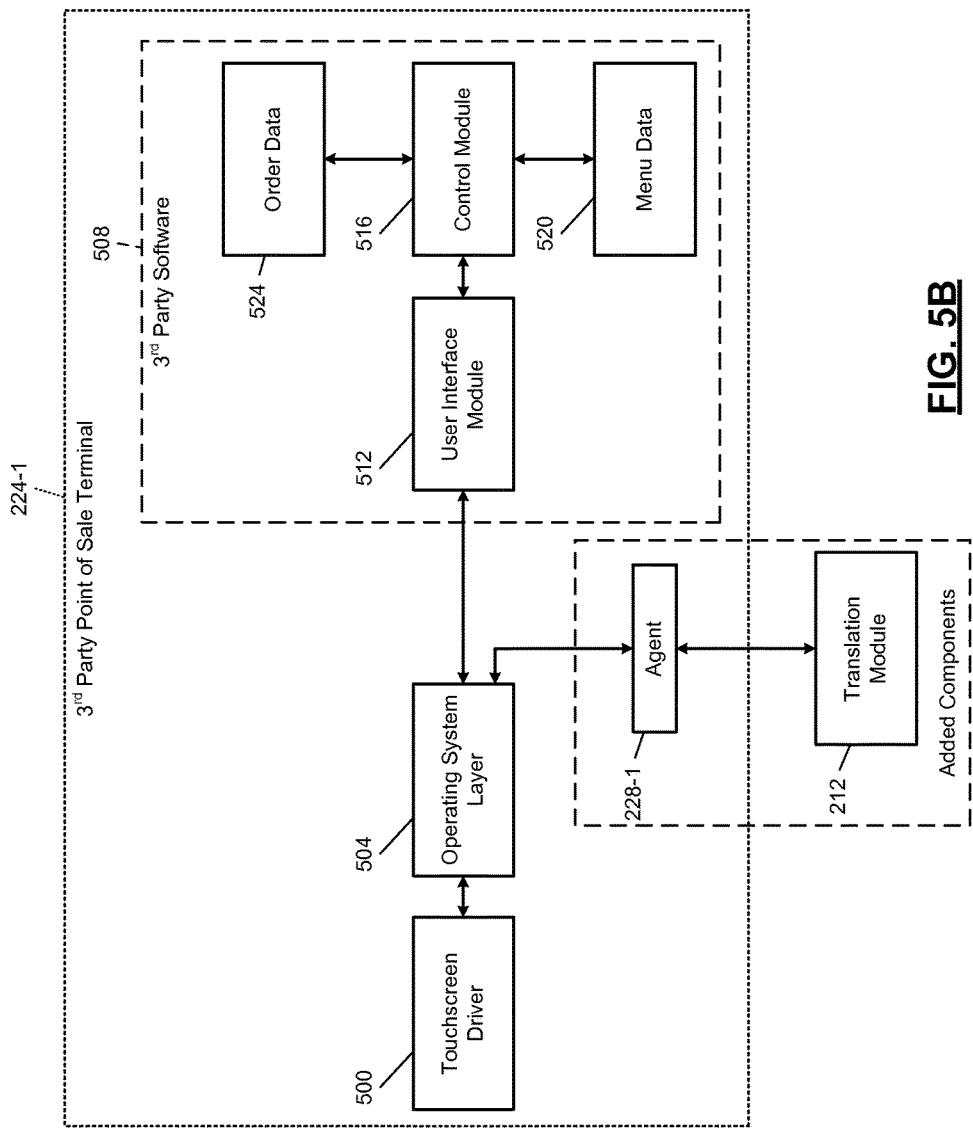
FIG. 5B is a simplified functional block diagram of the third-party point of sale terminal.

In FIG. 5B, a functional block diagram of software executed on the third-party point of sale 224-1 is shown. A touchscreen driver 500 interfaces between the touchscreen 400 of FIG. 5A and an operating system layer 504. The operating system layer 504 transmits sensed touches to third-party software 508 executing on the third-party point of sale terminal 224-1. A user interface module 512 of the third-party software 508 interprets the touches to determine which buttons have been pressed. The user interface module 512 may update the display accordingly, and may provide visual and/or other feedback (such as haptic feedback) that the touch was detected.

A control module 516 may determine which screens to display and what items have already been added to an order. The control module 516 constructs menus based on menu data 520, which may include item names and prices. The control module 516 stores entered order information as order data 524. The control module 516 selectively transmits the order data 524 to the third-party backend server 220 using the communications interface 412 of FIG. 5A.

In addition to the third-party software 508, an agent 228-1 is installed and executed on the third-party point of sale terminal 224-1. The agent 228-1 has hooks into the operating system layer 504 so that the agent 228-1 can transmit user interface events such as touchscreen touches or mouse clicks that will be passed to the user interface module 512 as if they had originated from the touchscreen 400 of FIG. 5A.

In addition, the agent 528-1 may read the current state of the display being sent to the touchscreen driver 500. This display can be used to verify that the translation module 212 is properly synchronized with the third-party software 508, as well as to capture data being provided by the third-party software 508. For example, order identification information (such as order number and total order dollar value) may be retrieved from screenshots. These screenshots may be processed using optical character recognition (OCR) software either on the agent 228-1 or the translation module 212. In addition, during initial setup, interface elements of the menus displayed by the user interface module 512 may be acquired by the agent 228-1 for use in programming the translation module 212.

Figure 6:
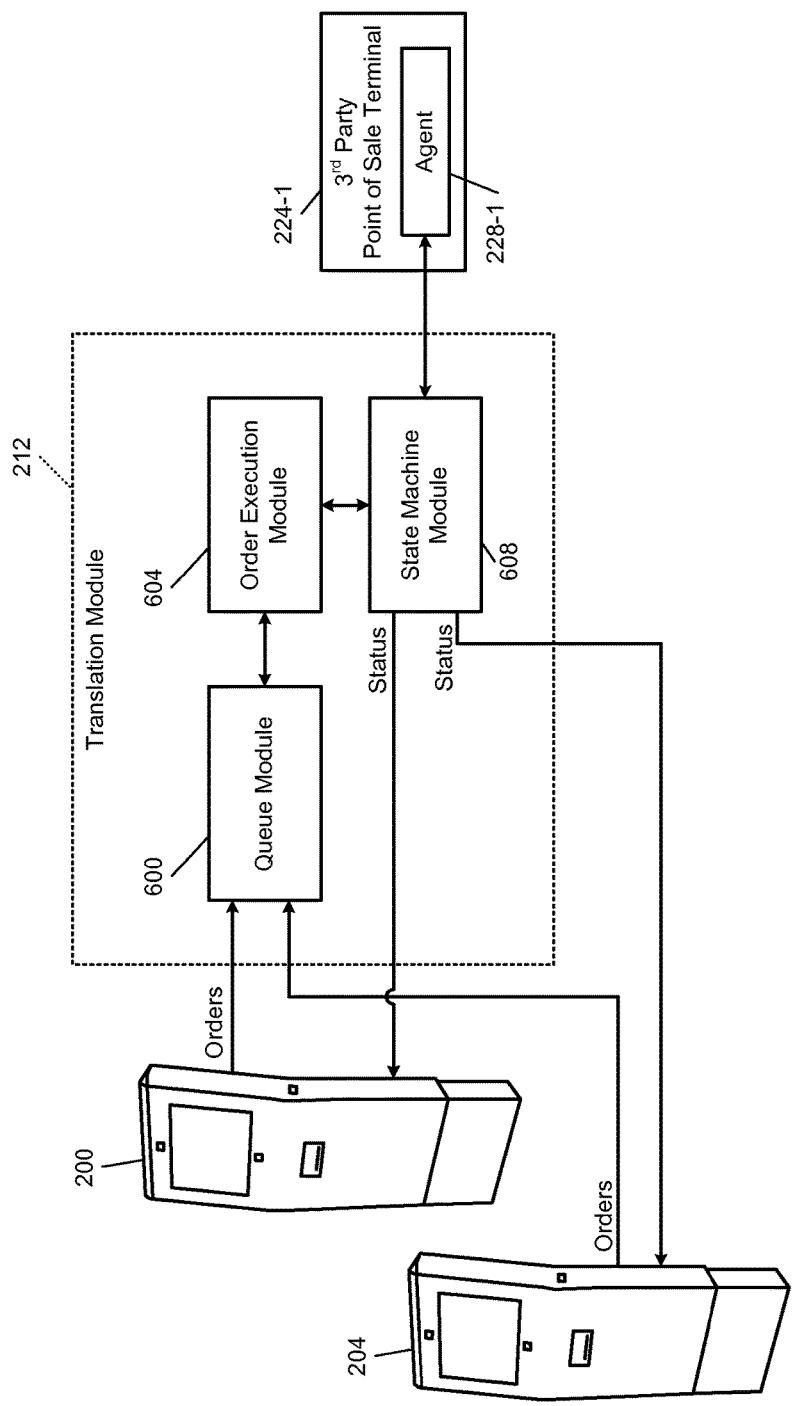
FIG. 6 is a functional block diagram of an example implementation of a translation module.

In FIG. 6, a functional block diagram of an example implementation of the translation module 212 is shown. The translation module 212 includes a queue module 600 that receives orders from the kiosks 200 and 204. These orders are stored until they can be conveyed to third-party point of sale terminals, such as the third-party point of sale terminal 224-1.

An order execution module 604 takes one order at a time from the queue module 600 and orders each item in the selected order from the third party point of sale terminal 224-1. A state machine module 608 tracks which menu is currently being displayed by the third-party point of sale terminal 224-1, and sends commands to the agent 228-1 to navigate through the menus of the third-party point of sale terminal 224-1 to order each item requested by the order execution module 604.

The state machine module 608 also provides status information to the kiosks 200 and 204. This status information may include an indication that the order has been correctly received and placed, and may include an order number. Although depicted functionally in FIG. 6 as two separate arrows, the kiosk 200 may communicate with the translation module 212 using a single bidirectional interface. This bidirectional interface may be proprietary or standardized, wired or wireless, and may be compliant with IEEE 802.3-2012 or IEEE 802.11-2012. The kiosk 204 may communicate with the translation module 212 using the same interface as does the kiosk 200.

When multiple third-party point of sale terminals are used, multiple copies of the order execution module 604 and the state machine module 608 may be implemented. In this way, each state machine module tracks the state of a respective third-party point of sale terminal, and each order execution module is responsible for conveying orders to the respective third-party point of sale terminal. The queue module may be shared between the order execution modules or each order execution module may have its own respective queue module.

Figure 7:
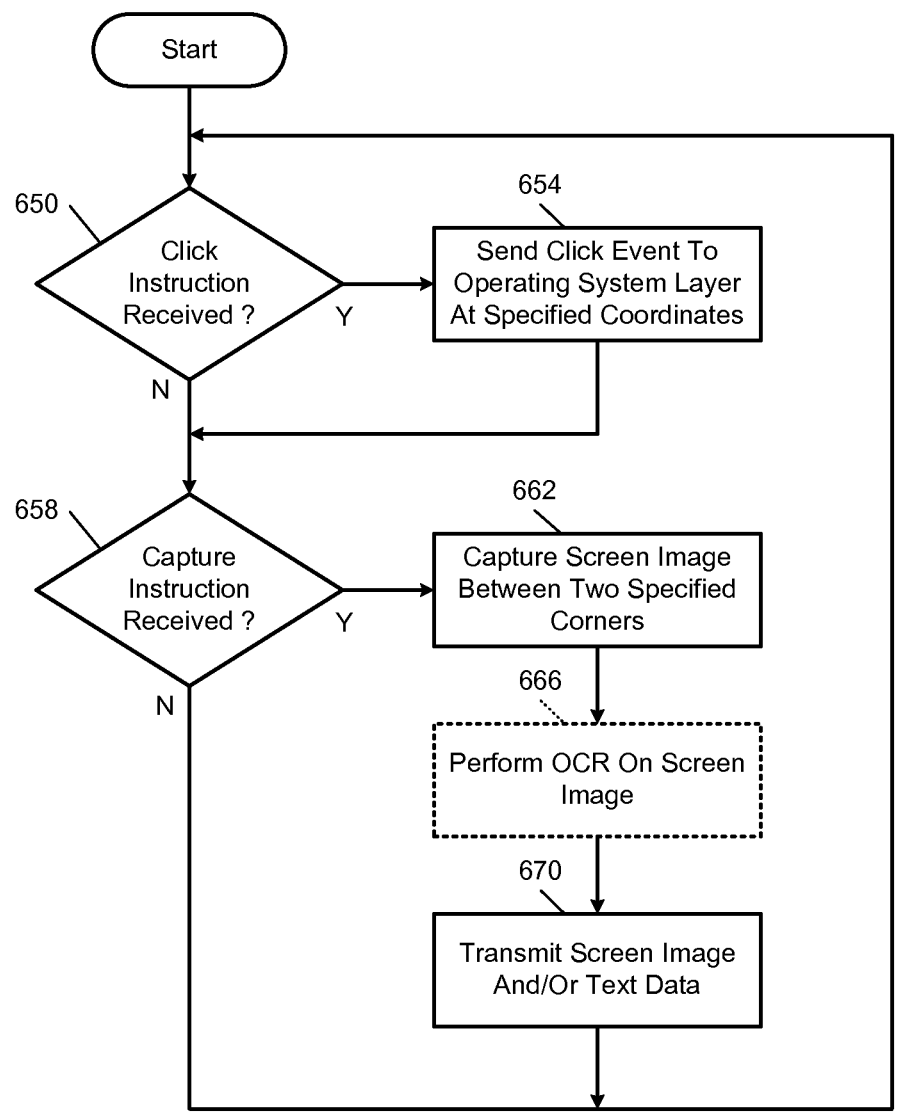
FIG. 7 is a flowchart depicting example operation of an agent, which is installed on the third-party point of sale terminal.

In FIG. 7, example operation of an agent according to the principles of the present disclosure is described. Although the agent as shown here is fairly simple, in other implementations the agent may include some or all of the functionality of the translation module 212. In various implementations, the agent may be implemented with limited intelligence so that the potentially limited system resources (such as memory and processing power) of the third-party point of sale terminal are not taxed.

Control begins at 650, where if a click instruction is received from a translation module, control transfers to 654; otherwise, control transfers to 658. Although the term click is used, clicks and touches may be functionally interchangeable depending on the operating system and hardware used by the third-party point of sale terminal. For example, a touch may be conveyed to the operating system as simply a click at the coordinates of the touch. When touches and clicks are not interchangeable, the agent will generate either touch events or click events according to what is expected by the third-party software. At 654, control sends a click event to the operating system layer at the coordinates specified by the click instruction. Control then continues at 658.

At 658, control determines whether a capture instruction has been received from the translation module. If so, control transfers to 662; otherwise, control returns to 650. At 662, control captures a screen image. In various implementations, the capture instruction may specify a specific region of the screen to capture. One way to specify this region is by specifying the x and y coordinates (in units of, for example, pixels) of diagonally opposite corners.

Control continues at 666, where OCR is optionally performed on the captured image. While OCR may be computationally intensive, the resulting text may be transmitted without also transmitting the image, substantially reducing bandwidth usage. Therefore, whether the agent performs OCR or not may be determined based on whether bandwidth or processing power at the third-party point of sale terminal is at a premium. Control continues at 670 where screen image and/or text data is transmitted to the translation module. Control then returns to 650.

Figure 8A:
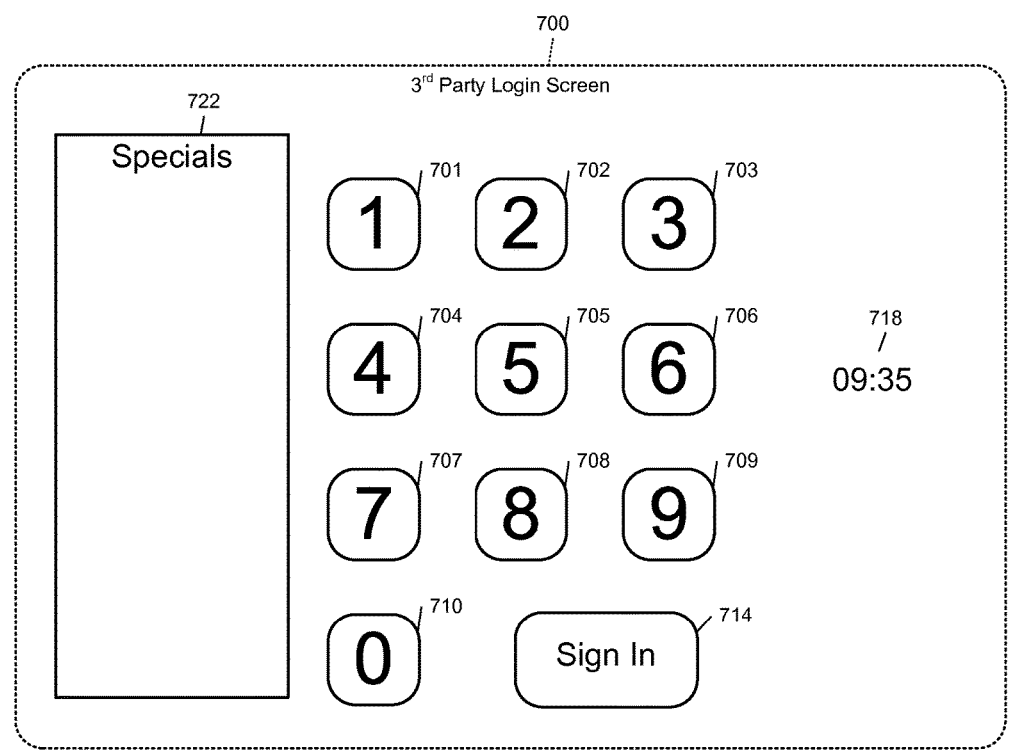
FIG. 8A is an illustrative login screen for a third-party point of sale terminal.

In FIG. 8A, an example third-party login screen 700 for a third-party point of sale terminal is shown for purposes of illustration. The third-party login screen may include a number of user interface elements, such as a button 701 corresponding to the numeral 1, a button 702 corresponding to the numeral 2, and buttons 703, 704, 705, 706, 707, 708, 709, and 710. These numerals may allow an employee to authenticate to the third-party point of sale terminal. This tracks which employee places which order, and prevents customers from inadvertently accessing the third-party point of sale terminal. The third-party login screen 700 may also include a sign in button 714 to be pressed after the employee's authentication code is entered. In addition, the current time may be displayed at 718, and a list of current promotions or specials may be displayed at 722.

Figure 8B:
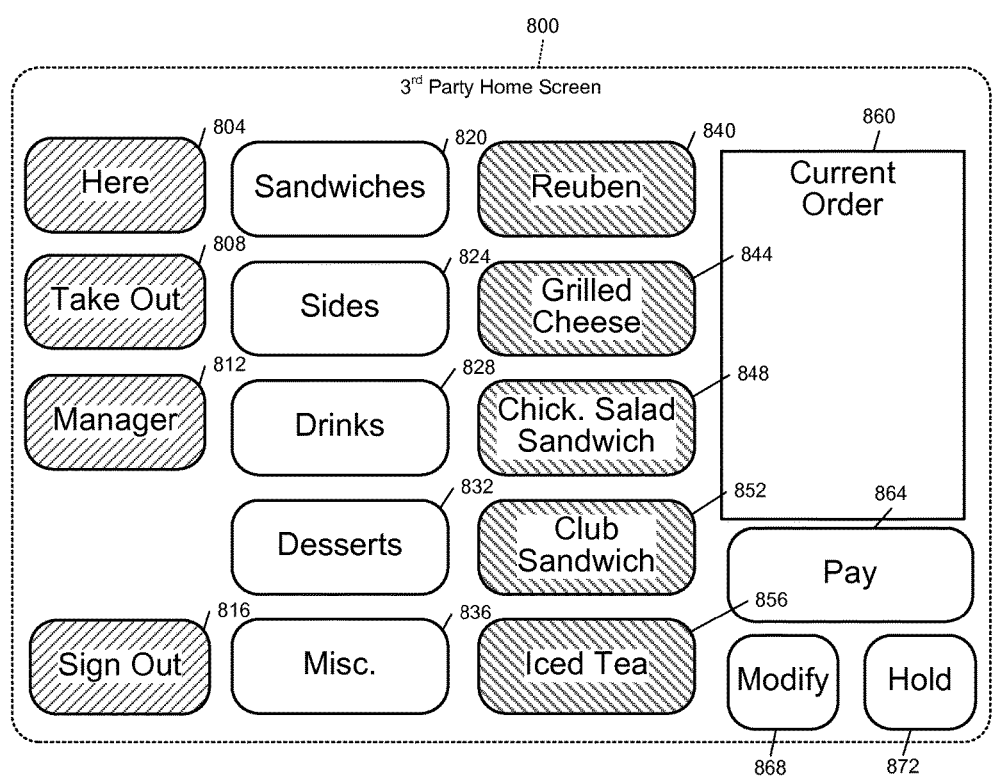
FIG. 8B is an illustrative ordering home screen for the third-party point of sale terminal.

In FIG. 8B, an example home screen 800 that is reached after signing in is shown for illustrative purposes. While this example is from the restaurant context, the ordering system of the present disclosure can be used in any business that receives customer orders and has a point-of-sale system. Further, the interfacing system of the present disclosure can be used in conjunction with kiosks and point-of sale terminals that do not receive customer orders for food or other items. For example, the interfacing system of the present disclosure may be used to provide kiosks at an airport that allow passengers to check in for their flights. The kiosks may interface with existing backend systems using the present disclosure. For example, an agent can be installed in an existing kiosk or existing point of sale terminal to place orders from a translation module.

Even further, the present disclosure can be applied to online ordering portals. For example, a kiosk can be programmed with the menus for multiple restaurants that each offer online ordering capability. The kiosk can receive an order from a customer and convey the order to the respective restaurant through the respective online ordering system. This kiosk may provide a more convenient method of ordering than accessing an unfamiliar website. In addition, the kiosk may actually process the payment and then send a separate payment to the website on behalf of the customer. In this way, the customer's payment information is not provided to the website.

The kiosk may provide a uniform ordering experience across multiple restaurants whose websites are quite different in form and usability. Such a kiosk may charge a small percentage of the order amount and/or a fixed fee for this service. The kiosk may also identify the customer through any number of mechanisms, and suggest previous orders, items, and modifications (such as an increased or reduced condiment).

If the kiosk is unable to communicate with a certain restaurant's website, the kiosk may indicate the unavailability of the respective restaurant (such as by graying out the icon or text for the restaurant). If more than a predetermined period of unavailability is detected, an administrator may be alerted. Additionally or alternatively, if more than a predetermined number of errors occur when transmitting orders to a restaurant online ordering system within a predetermined period of time, the administrator may be alerted.

Returning to FIG. 8B, the home screen 800 may include buttons that apply to an entire order, such as "Here" 804 or "Take Out" 808. In addition, a "Manager" button 812 or a "Sign Out" button 816 may be relevant to an interactive usage of the third-party point of sale system, but might not be used by the agent. In various implementations, however, the agent may "Sign Out" after placing every order to reach a uniform point from which to begin the next order. Otherwise, for point of sale terminals have an auto-signout feature, the agent may first need to determine whether the third point of sale terminal has signed out or not before placing an order.

The home screen 800 includes buttons that allow the employee to navigate to submenus, such as sandwiches 820, sides 824, drinks 828, desserts 832, and miscellaneous 836. In addition, the most commonly ordered items may be shown on the home screen 800 for rapid ordering. As examples only, these buttons are shown in FIG. 8B as a reuben 840, a grilled cheese 844, a chicken salad sandwich 848, a club sandwich 852, and an iced tea 856. The home screen 800 also includes a running tally of the items in the current order display 860 and may include a total dollar amount.

The current order display 860 shows what has been ordered, and may also allow for items to be selected, which then presents options for modification or removal. A pay button 864 signifies the end of the order, while a modify button 868 may bring up a screen used for detailed and/or bulk modification of items in the current order, such as changing modifiers on a group of sandwiches, or duplicating items. A hold button 872 may be used in an interactive setting to temporarily hold the customer's order, such as if the customer needs to retrieve their wallet.

Referring now to FIGS. 9 and 10, the kiosks produce orders including sets of items that make up the order. The translation module therefore needs to interact with the third-party point of sale terminal to order each item from the set of items. The translation module determines a mapping from menu items to the clicks/touches that will order that item on the third-party point of sale terminal.

Although the present disclosure is compatible with any organizational approach to the third-party software, two examples are explored in detail below. The first (corresponding to FIGS. 9, 11, and 14) is a linear approach, in which every menu item is associated with a series of clicks that will order the item and return to the home screen. This series of clicks may be specified as simply a series of X, Y coordinates.

While conceptually simple, this may not lead to the most efficient placement of orders. For example, if multiple sandwiches need to be ordered from a sandwich submenu, this approach will require navigating from the home screen to the sandwich menu and back for each item. Therefore, an alternative organizational approach is shown in FIG. 10 (and corresponding FIGS. 12 and 15), where each menu screen is characterized and therefore the set of items within an order can be optimized so that, for example, all of the sandwiches are ordered at once.

In FIG. 9, the first approach is depicted. For example, the login action corresponds to a click sequence of X,Y coordinates. These X,Y coordinates correspond to, for example, the numeric buttons of FIG. 8A and end with a click on the sign in button 714 of FIG. 8A. Five more labels are shown as examples. For example, a Dine_In label may correspond to a click sequence that clicks on the here button 804 of FIG. 8B.

The Take_Out label may correspond to a click sequence that includes clicking on the takeout button 808 of FIG. 8B. The Cash_Out label may correspond to the pay button 864 of FIG. 8B. The French Dip label may correspond to a click sequence that includes clicking the sandwiches button 820 of FIG. 8B followed by a french dip button on a sandwiches submenu (not shown). A similar click sequence is stored for a pulled pork sandwich.

Note that the action label does not necessarily match the text of the third-party point of sale terminal. The action label is consistent with the nomenclature used by the kiosks 200 and 204, while the third-party software may use alternative nomenclature. These click sequences are developed and stored during a setup process described in more detail below. The X,Y coordinates may correspond to an exact center of each button, or may simply be anywhere within the button borders.

In FIG. 10, a database structure is shown that characterizes each screen or menu of the third-party software. Each row (or, in database terminology, record) has a unique element ID. The record may store the third-party text corresponding to the interface element of the third-party software, and may specify the boundaries of the interface element. Assuming that the interface element is rectangular, the boundary can be determined based on X,Y coordinates of diagonally opposite corners of the interface element.

The record includes which screen number the interface element is found on, and an assigned type for the interface element. Various interface elements are assigned a label, and for interface elements that navigate to another screen, the identifier of that screen is stored. For example, the login screen 700 of FIG. 8A is referred to as screen number 0 in FIG. 10. The "Sign In" button (see element ID 10)) navigates to the home screen 800 of FIG. 8B (screen 1).

Each numeric button on the login screen is assigned a type of "Button", and assigned a label corresponding to the numeric value. Note that the specials area is identified as element ID 11, but is assigned a type "Ignore" because the specials section may be irrelevant in a non-interactive use of the third-party point of sale terminal. Similarly, the time display can be ignored.

Identification of the interface elements of the third-party point of sale terminal may be automatically performed, such as by using edge detection on a screenshot. The third-party text for each interface element may then be automatically filled in based on OCR of the screenshot. Note that element IDs 21 through 25 have the type "Menu" and have been assigned labels consistent with example nomenclature of data generated by the kiosks 200 and 204. Element IDs 16-20 are of a "Navigate" type, and therefore have associated next screen numbers. Element ID 30 would be the "Sign Out" button 816 of FIG. 8B. Subsequent element IDs would correspond to other screens, such as the sandwiches screen.

In other words, in this example implementation: the "Menu" type corresponds to a user interface element that causes a menu item to be added to the order; the "Navigate" type corresponds to a user interface element that changes to another screen; the "Text" type corresponds to a user interface element that displays text of interest to the translation module; the "Button" type corresponds to a user interface element that performs some other function than changing to another screen or adding an item to the order; and the "Ignore" type corresponds to a user interface element that might be relevant to an interactive use of the point of sale terminal but is ignored by the agent.

In order to place an order using the structure of FIG. 10, a login is first accomplished. The numeric ID sequence may be predefined, and the Login_0 through Login_9 assigned labels are used to determine how to enter the numeric ID sequence. Click events are sent based on the stored coordinates. For example only, the midpoint of each button may be calculated by averaging the diagonal X coordinates to arrive at the X coordinate of the click and averaging the diagonal Y coordinates to arrive at the Y coordinate of the click. Then the Login label is activated to navigate to screen 1.

During an order optimization process, the optimization process groups together items based on the screen from which they are available. For example, any items in the order that are present on the home screen (screen 1) may be ordered first. Then, continuing the example, sandwiches are grouped together because they are available on screen 2. When it is time to order the sandwiches, the translation module navigates to screen 2 using the coordinates for element ID 16 and then orders the sandwiches based on the menu type elements for screen 2 (not shown). The translation module navigates back to the home screen based on which interface element in screen 2 has a type of navigate and a next screen of 1.

Figure 11:
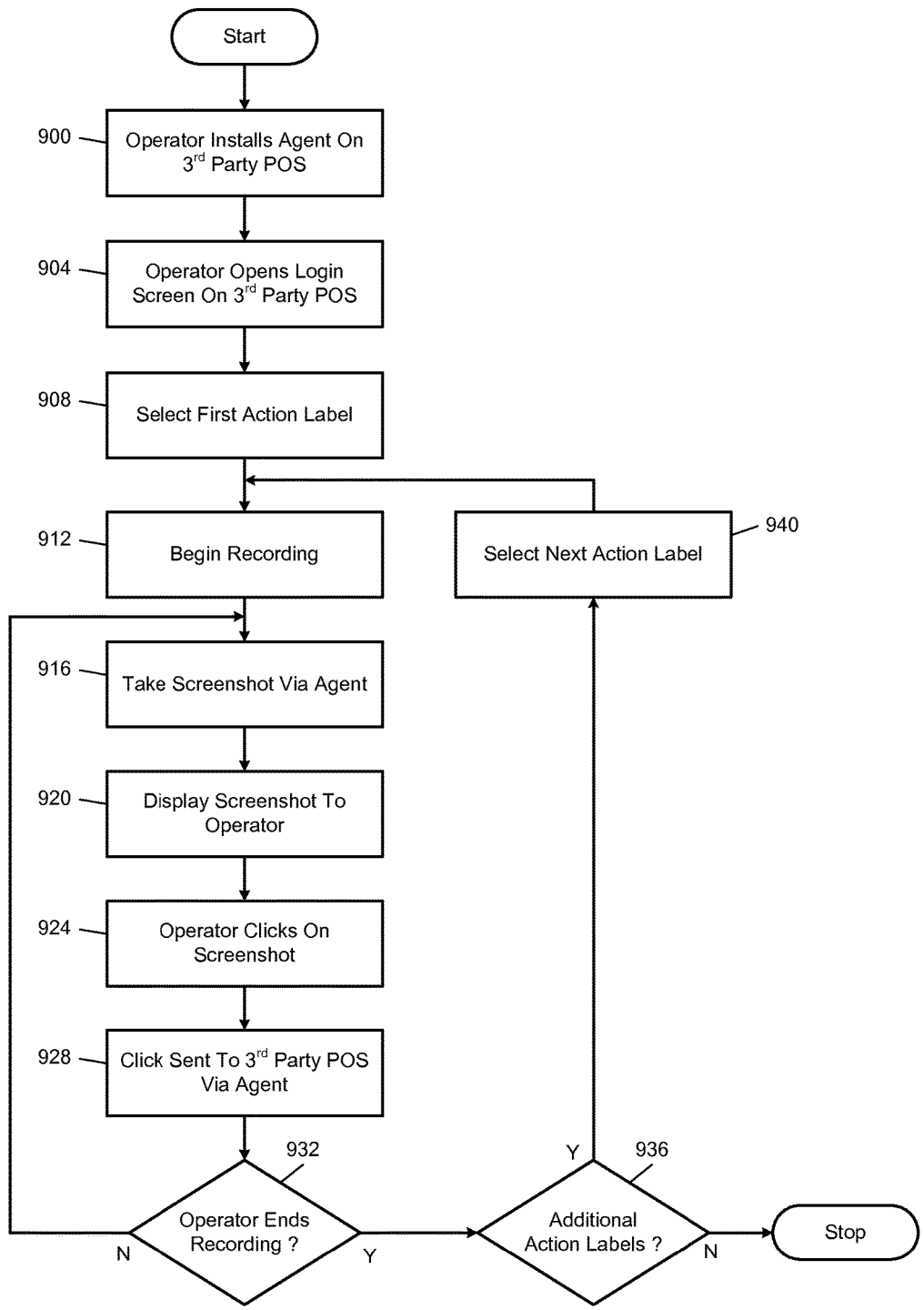
FIG. 11 is a flowchart depicting example operation of setting up the agent and establishing a mapping of the third-party point of sale terminal using a data structure such as is shown in FIG. 9.

In FIG. 11, the initialization performed by an installer/operator using a data structure similar to FIG. 9 is shown. Control begins at 900 where the operator installs the agent on the third-party point of sale terminal. This installation may be performed in person. Alternatively, the installation may be performed remotely if remote access is available to the third-party point of sale terminal or if a local representative can perform the installation. The operator then executes the third-party software on the third-party point of sale terminal and reaches the login screen at 904.

The translation module or a remote equivalent to the translation module is then entered into a programming mode. At 908, a first action label is selected. Each action label corresponds to an action such as logging in or ordering an item, and will have a corresponding series of click coordinates. The action labels may be predefined based on the menu items that are available in the kiosks. The programming mode may therefore have a predetermined list of action labels to be programmed by the operator.

At 912, the translation module begins recording click coordinates. Then, the agent is instructed to take a screenshot at 916. The screenshot is displayed to the operator at 920. At 924, the operator begins clicking to perform the selected action. After the operator clicks on the screenshot and the coordinates of the click are recorded, control continues at 928. The coordinates of the click are sent to the agent at 928 so that the click can be conveyed to the third-party software.

Control continues at 932 where the operator determines whether to end recording. In various implementations, the operator will end recording once the item has been ordered and the operator has navigated back to the home screen. If the operator decides to end recording, control transfers to 936; otherwise, control returns to 916.

At 936, control determines whether there are additional action labels that need to be programmed, if so, control transfers to 940; otherwise, control ends. At 940, control selects the next action label and transfers to 912.

Figure 12:
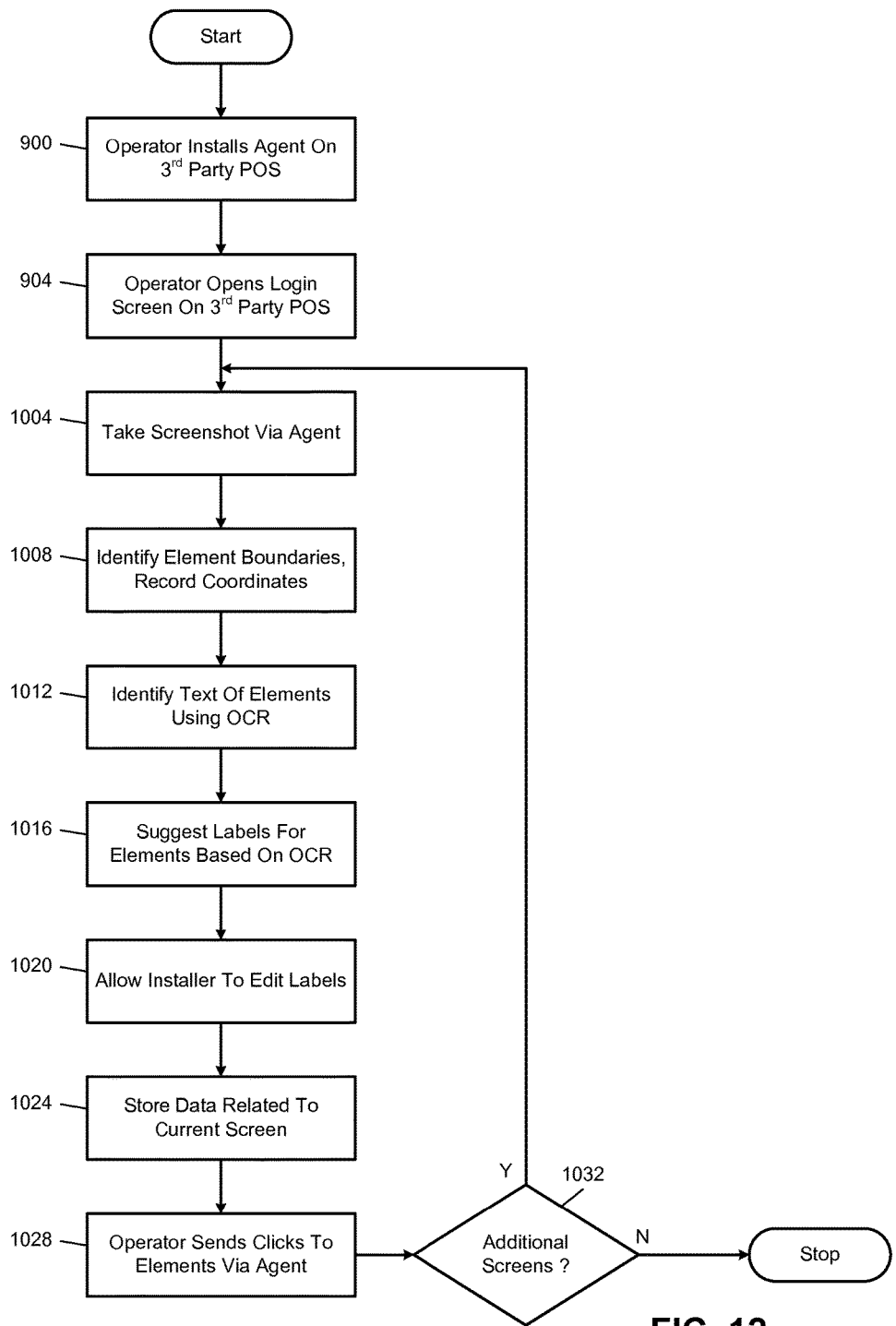
FIG. 12 is a flowchart depicting example operation of setting up the agent and establishing a mapping of the third-party point of sale terminal using a data structure such as is shown in FIG. 10.

In FIG. 12, the actions taken by an operator to characterize the third-party software to create a data structure such as that of FIG. 10 are shown. At 900, the operator installs the agent on the third-party point of sale terminal, and at 904, the operator executes the third-party software and arrives at the login screen.

Control continues at 1004 where a screenshot is taken by the agent. At 1008, interface elements of the screenshot are identified, and their boundaries are detected and recorded. Any text associated with the interface elements is identified at 1012 using optical character recognition. At 1016, labels are suggested for interface elements based on the recognized text. For example, if the recognized text is "Reuben", the suggested label may be sand_reuben based on a matching algorithm. The matching algorithm may simply identify partial string matches, or may implement a fuzzy logic algorithm.

At 1020, the operator is given the opportunity to edit the suggested labels. For example, recognized text of chicken salad may receive a suggestion of sand_chickensalad, however, the operator may determine that the chicken salad button on the third-party software actually refers to a salad having chicken. The operator can therefore edit the label to be assigned to that button.

The operator also specifies types for each interface element, such as ignore, menu, button, or navigate. At 1024, the data for each element of the current screen is stored in a data structure such as that shown in FIG. 10. Control continues at 1028 where the operator can send one or more clicks to various elements via the agent. For example, the operator may navigate to another screen to characterize that screen. Control continues at 1032 where if the operator indicates there are additional screens, control returns to 1004; otherwise, control ends. The programming mode may suggest that additional screens remain if all of the menu items in the kiosks have not yet been found on one of the third-party point of sale terminal screens.

Figure 13:
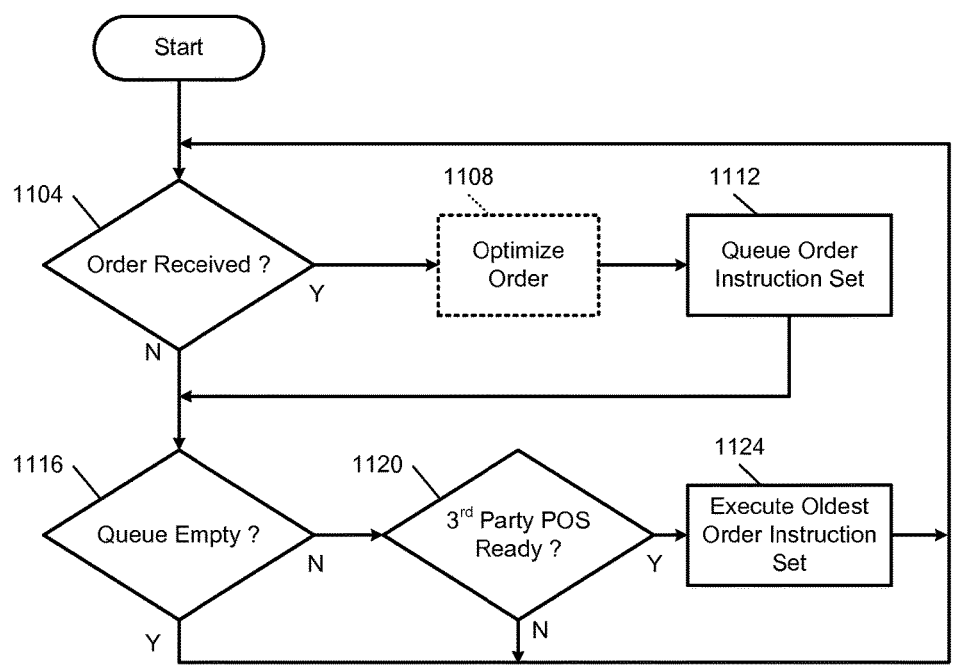
FIG. 13 is a flowchart depicting example operation of a queue module.

In FIG. 13, example queue operation is shown. Control begins at 1104 where if an order is received from a kiosk, control transfers to 1108. At 1108, the order is optionally optimized. For example, optimizing the order may cause menu items located on the same screen to be grouped together. Control continues at 1112 where an order instruction set is queued.

The order instruction set may be a list of action labels that will be executed in order to convey the order to the third-party point of sale terminal. Alternatively, if the data structure of FIG. 10 is used, the order instruction set may be an ordered list of screens, and for each screen there is an ordered list of items to order from that screen. In various other implementations, the set of items in the order is simply stored in the queue, and the translation module will determine how to convey the order at the time of executing the order.

Control continues at 1116. If the queue is empty at 1116, control returns to 1104; otherwise, because the queue is not empty, control transfers to 1120 where control determines whether the third-party point of sale terminal is ready. If so, control transfers to 1124 to execute the order; otherwise, control returns to 1104. At 1124, control executes an order instruction set in order to convey the order to the third-party point of sale terminal. In various implementations, the queue is implemented as first in, first out, so the oldest order instruction set is executed first. Control then returns to 1104.

Figure 14:
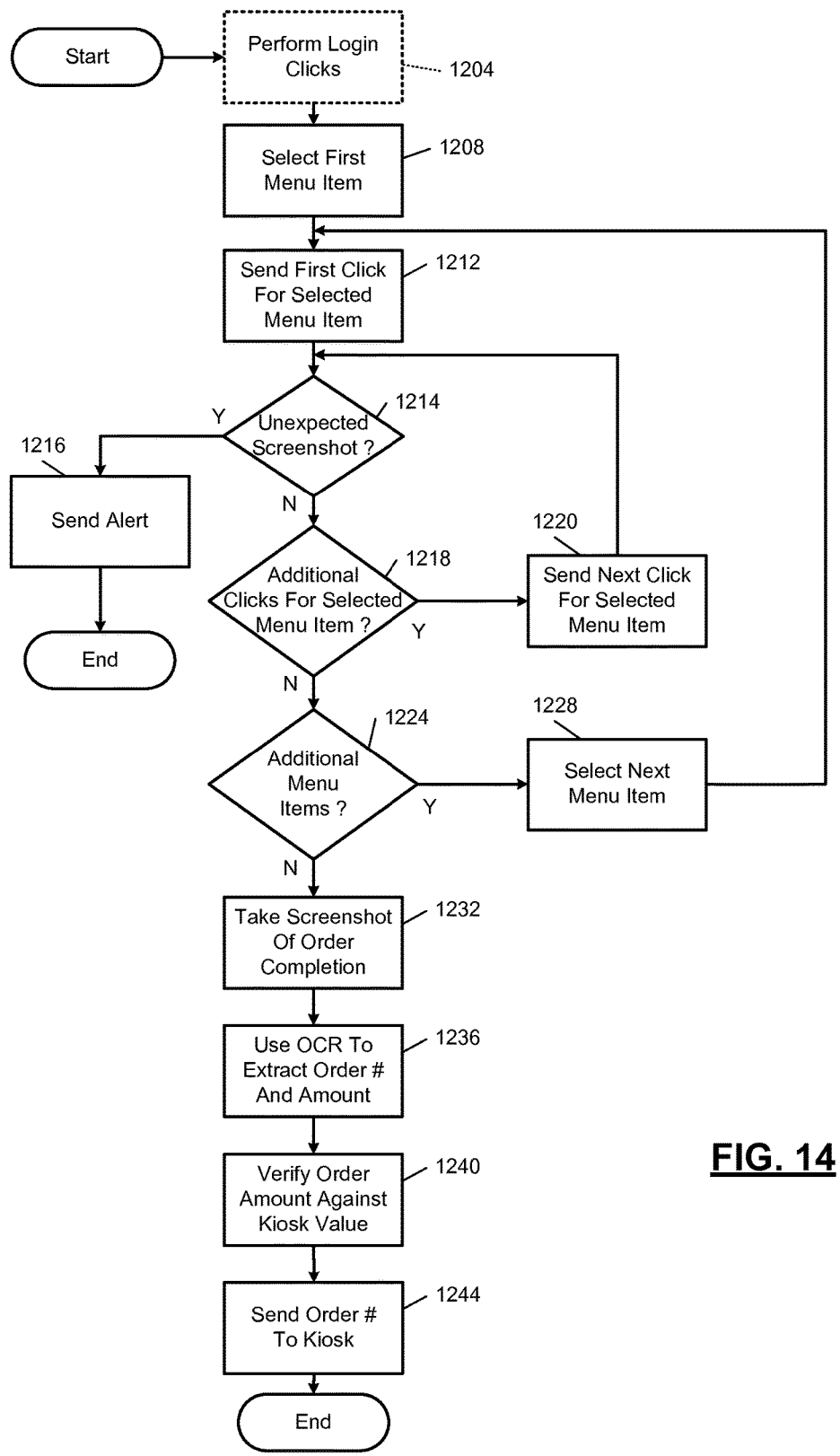
FIG. 14 is a flowchart depicting conveyance of an order to the third-party point of sale terminal in accordance with a data structure such as is shown in FIG. 9.

In FIG. 14, placing an order using click sequences such as those shown in FIG. 9 is described. Control begins at 1204 where control performs the click sequence corresponding to the login label. This step is shown with a dotted line because a login operation may only need to be performed once per day, or once each time the point of sale terminal is powered off and on, or after a predetermined period of inactivity. Whether a login sequence is needed may be determined by analyzing a screenshot taken by the agent.

Control continues at 1208 where the first menu item in the order is selected. Control continues at 1212 where control sends the first click in the click sequence corresponding to the selected menu item. At 1214, control analyzes a screenshot to determine whether the sent click had the intended effect. If an unexpected state has resulted, control transfers to 1216; otherwise, control transfers to 1218.

The screenshot may be compared to a reference screenshot taken during setup of the system, and any deviation may indicate a problem. The screenshot comparison may be limited to a certain portion of a screen, as certain other portions may be dynamic and not relevant to a comparison (for example, a scrolling announcement banner or advertisements). Alternatively, optical character recognition may be used to determine the content of user interface elements in the screenshot, and this content is compared to reference content determined during setup of the system. At 1216, an alert is sent of an unexpected state. This may prompt a re-configuration of the system and an error message to the customer who had placed the order. Control then ends.

At 1218, if there are additional clicks for the selected menu item, control transfers to 1220; otherwise, control transfers to 1224. At 1220, control sends the next click in the sequence for the selected new item and returns to 1218.

At 1224, control determines whether there are additional menu items in the order. If so, control transfers to 1228; otherwise, control transfers to 1232. At 1228, control selects the next menu item in the order and returns to 1212. At 1232, control takes a screenshot of the completed order. At 1236, control may extract an order number and/or an amount from the screenshot using optical character recognition.

In implementations where the method is being used for operations other than ordering, control may extract other data. For example only, in a flight check-in context, the extracted data may include seat assignment, gate information, flight number, estimated departure time, and/or boarding time.

At 1240, control verifies the order amount extracted from the screenshot against a value calculated by the kiosk (or, kiosk). If these amounts do not match, an error condition may be signaled. This may indicate a pricing discrepancy or that the interface of the third-party point of sale terminal has changed and a reprogramming of the translation module is necessary. Control continues at 1244 where the order number is sent back to the kiosk to be provided to the user. Control then ends.

Figure 15:
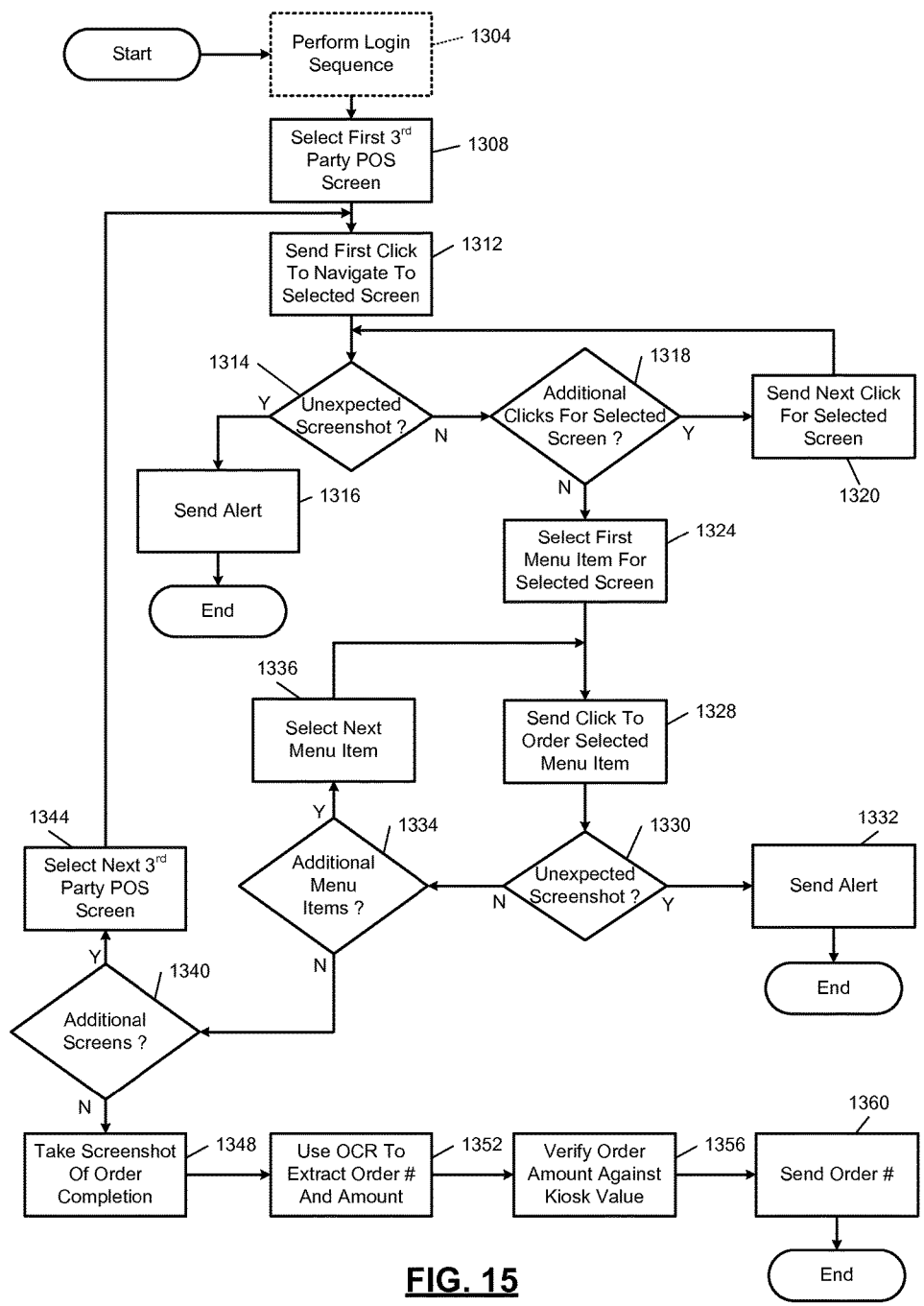
FIG. 15 is a flowchart depicting conveyance of an order to the third-party point of sale terminal in accordance with a data structure such as is shown in FIG. 10.

In FIG. 15, an example method of conveying an order to the third-party point of sale terminal using a structure such as that shown in FIG. 10 is described. Control begins at 1304 where the login sequence is performed. The login sequence may be omitted if the third-party software is already past the login screen at the home screen.

Control continues at 1308 where control selects the first screen of the third-party point of sale terminal at which menu items will be ordered. At 1312, control sends a first click to the third-party point of sale terminal via the agent to begin navigating to the selected screen. Control continues at 1314, where control analyzes a screenshot to determine whether the navigation clicks are having the intended effects. If an unexpected state has resulted, control transfers to 1316; otherwise, control transfers to 1318. This comparison may be performed similarly to that of FIG. 14.

At 1316, an alert is sent of an unexpected state. This may prompt a re-configuration of the system and an error message to the customer who had placed the order. Control then ends. At 1318, if additional clicks are necessary to navigate to the selected screen, control transfers to 1320; otherwise, control transfers to 1324. At 1320, control sends the next click to navigate toward the selected screen and control returns to 1318. From the data structure in FIG. 10, all of the navigate type elements may be combined into a tree and shortest traversals through the tree can be determined to arrive at each screen in a minimum number of clicks.

At 1324, control selects the first menu item that can be ordered from the selected screen. Control continues at 1328 where a click is sent to the agent to order the selected menu item. In various implementations, additional clicks (not shown) may be necessary to select various modifiers related to the menu item. Those modifiers will be present on their own screen and will therefore have corresponding entries in the data structure.

At 1330, control determines whether an unexpected result has occurred as the result of the click sent in 1328. If so, control transfers to 1332; otherwise, control transfers to 1334. At 1332, control sends an alert of the unexpected state and control ends.

At 1334, if there are additional menu items, control transfers to 1336; otherwise, control transfers to 1340. At 1336, control selects the next menu item that is available from the current screen and control returns to 1328.

At 1340, control determines whether any items remain to be ordered from other screens. If so, control transfers to 1344; otherwise, control transfers to 1348. At 1344, control selects the next screen for navigation purposes and returns to 1312. At 1348, control takes a screenshot of order completion. Control continues at 1352 where an order number and amount are extracted using optical character recognition. At 1356, control verifies the order amount against a value calculated by the kiosk for the order. If these numbers do not match, an error condition is present. Control continues at 1360 where the order number is returned to the kiosk for display to the user. Control then ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. An ordering system for a business, the ordering system comprising:
an ordering terminal configured to receive a first order from a first person;
a queue module configured to store data representing the first order;
an order execution module configured to convey the first order to a point of sale terminal; and
an agent installed on the point of sale terminal and configured to selectively send user interface events to a point of sale application executing on the point of sale terminal,
wherein the order execution module is configured to convey the first order to the point of sale terminal by (i) retrieving the data representing the first order from the queue module and (ii) instructing the agent to send user interface events according to the retrieved data.

2. The ordering system of claim 1 wherein the ordering terminal is offered for sale by a first vendor, wherein the point of sale terminal is offered for sale by a third party vendor and not by the first vendor, and wherein the first vendor provides the queue module, the agent, and the order execution module to allow the ordering terminal to interface with the point of sale terminal.

3. The ordering system of claim 1 wherein the ordering terminal is offered for sale by a first vendor, wherein the point of sale terminal is offered for sale by a third party vendor and not by the first vendor, and wherein a second vendor provides the agent and the order execution module to allow the ordering terminal to interface with the point of sale terminal.

4. The ordering system of claim 1 wherein the ordering terminal comprises a kiosk including a touchscreen adapted for use by customers of the business.

5. The ordering system of claim 1 wherein the ordering terminal comprises a second point of sale terminal adapted for use by employees of the business.

6. The ordering system of claim 1 further comprising a second agent installed on a second point of sale terminal, wherein the order execution module is configured to convey a second order to the second point of sale terminal by instructing the second agent to send user interface events to the second point of sale terminal according to data representing the second order.

7. The ordering system of claim 1 further comprising a second ordering terminal configured to receive a second order from a second person, wherein the queue module is configured to store data representing the second order.

8. The ordering system of claim 1 further comprising a server implementing the queue module and the order execution module.

9. The ordering system of claim 8 wherein the server also implements the queue module.

10. The ordering system of claim 9 wherein the server is configured to receive a second order from a computing device of a second person over a wireless local area network.

11. The ordering system of claim 8 further comprising a digital menu board displaying an image including items for sale, wherein the image is provided to the digital menu board by the server.

12. The ordering system of claim 8 wherein the server is configured to receive a second order from a second person via the internet.

13. The ordering system of claim 1 further comprising a web server configured to (i) receive a second order from a second person via the internet and (ii) transmit the second order to the queue module.

14. The ordering system of claim 1 further comprising a second point of sale terminal configured to receive a second order from an employee of the business, wherein the queue module is configured to store data representing the second order.

15. The ordering system of claim 1 further comprising:
a second point of sale terminal configured to receive a second order from an employee of the business,
wherein the second point of sale terminal is configured to provide the second order to a backend server, and
wherein the point of sale terminal is configured to, subsequent to the first order being conveyed to the point of sale terminal, provide the first order to the backend server.

16. The ordering system of claim 1 wherein the first order comprises a set of items.

17. The ordering system of claim 16 wherein the set of items includes at least one food item.

18. The ordering system of claim 16 wherein:
the first order includes a modifier for a first item of the set of items; and
the order execution module is configured to convey the modifier to the point of sale terminal by instructing the agent to send user interface events corresponding to the modifier.

19. The ordering system of claim 1 further comprising a state machine module configured to monitor a state of the point of sale application.

20. The ordering system of claim 19 wherein the state machine module is configured to receive a screenshot of a user interface of the point of sale application from the agent.

21. The ordering system of claim 20 wherein the agent is configured to provide the screenshot in response to a request from the state machine module.

22. The ordering system of claim 21 wherein the request specifies coordinates of a region of interest, and wherein the screenshot provided by the agent is limited to the region described by the coordinates.

23. The ordering system of claim 20 wherein the state machine module is configured to perform optical character recognition on the screenshot.

24. The ordering system of claim 19 wherein the agent is configured to (i) perform optical character recognition on a user interface of the point of sale application to extract text data and (ii) transmit the text data to the state machine module.

25. The ordering system of claim 19 wherein the state machine module is configured to receive an order identifier from the point of sale terminal via the agent in response to completion of conveying the first order to the point of sale terminal.

26. The ordering system of claim 19 wherein the state machine module is configured to receive a monetary total from the point of sale terminal via the agent in response to completion of conveying the first order to the point of sale terminal.

27. The ordering system of claim 26 wherein the state machine module is configured to compare the monetary total to a value received from the ordering terminal.

28. The ordering system of claim 1 wherein the agent is configured to send user interface events to the point of sale application by sending the user interface events to an operating system of the point of sale terminal.

29. The ordering system of claim 1 wherein the user interface events include at least one of click events and touch events.

30. A method of operating an ordering system for a business, the method comprising:
receiving a first order from a first person at an ordering terminal;
storing data representing the first order; and
conveying the first order to a point of sale terminal by (i) retrieving the data representing the first order and (ii) according to the retrieved data, instructing an agent installed on the point of sale terminal to send user interface events to a point of sale application executing on the point of sale terminal.

31. The method of claim 30 wherein the user interface events include at least one of click events and touch events.

* * * * *